(12) United States Patent
Han et al.

(10) Patent No.: US 7,592,098 B2
(45) Date of Patent: *Sep. 22, 2009

(54) LITHIUM SECONDARY BATTERY OF IMPROVED PERFORMANCE

(75) Inventors: Changjoo Han, Seoul (KR); Jonghwan Kim, Seo-gu Daejeon (KR); Dong-Su Kim, Daejeon (KR); Hojin Jeon, Seoul (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/682,951

(22) Filed: Mar. 7, 2007

(65) Prior Publication Data

US 2007/0264569 A1    Nov. 15, 2007

(30) Foreign Application Priority Data

Mar. 8, 2006   (KR) .................. 10-2006-0021550

(51) Int. Cl.
*H01M 4/60* (2006.01)

(52) U.S. Cl. .................... 429/213; 429/249; 429/231.1; 429/231.9; 429/231.8

(58) Field of Classification Search .................. 429/66, 429/249, 252, 320
See application file for complete search history.

(56) References Cited

U.S. PATENT DOCUMENTS

| | | | |
|---|---|---|---|
| 6,096,456 A * | 8/2000 | Takeuchi et al. | 429/249 |
| 2005/0081370 A1* | 4/2005 | Kurihara et al. | 29/623.3 |
| 2006/0204847 A1* | 9/2006 | Ohzuku et al. | 429/223 |
| 2007/0003824 A1* | 1/2007 | Jo et al. | 429/66 |
| 2007/0243468 A1* | 10/2007 | Ryu et al. | 429/231.95 |

OTHER PUBLICATIONS

Xia, et al; "Studies on Li-Mn-O spinel system (obtained from melt-impregnation method) as a cathode for 4 V lithium batteries; Part V. Enhancement of the elevated temperature performance of Li/LiMn2)4 cells"; Journal of Power Sources: 24; pp. 24-28; (1998).

* cited by examiner

*Primary Examiner*—Patrick Ryan
*Assistant Examiner*—Angela J. Martin
(74) *Attorney, Agent, or Firm*—Cantor Colburn LLP

(57) ABSTRACT

Disclosed is a secondary battery comprising a lithium transition metal oxide as a cathode active material, wherein an organic ammonium compound is added to a cathode and/or is coated on a separator. Therefore, the secondary battery according to the present invention can achieve improvements in residual capacity and recovery capacity even after high-temperature storage of the battery, simultaneously with improved power retention of the battery at low and high temperatures.

6 Claims, No Drawings

LITHIUM SECONDARY BATTERY OF IMPROVED PERFORMANCE

FIELD OF THE INVENTION

The present invention relates to a lithium secondary battery with improved performance. More specifically, the present invention relates to a secondary battery comprising a lithium transition metal oxide as a cathode active material, wherein an organic ammonium compound is added to a cathode and/or is coated on a separator.

BACKGROUND OF THE INVENTION

Technological development and increased demand for mobile equipment have led to a rapid increase in the demand for secondary batteries as an energy source. Among other things, a great deal of research and study has been focused on lithium secondary batteries having high-energy density and high-discharge voltage. These lithium secondary batteries are also commercially available and widely used.

Generally, the lithium secondary battery uses a transition metal oxide such as $LiCoO_2$ as a cathode active material and a carbonaceous material as an anode active material, and is fabricated by disposition of a porous polyolefin separator between the anode and the cathode and addition of a non-aqueous electrolyte containing a lithium salt such as $LiPF_6$. Upon charging, lithium ions deintercalate from the cathode active material and intercalate into the carbon layer of the anode. In contrast, upon discharging, lithium ions deintercalate from the carbon layer of the anode and intercalate into the cathode active material. Here, the non-aqueous electrolyte serves as a medium through which lithium ions migrate between the anode and the cathode. Such a lithium secondary battery must be basically stable in an operating voltage range of the battery and must have an ability to transfer ions at a sufficiently rapid rate.

However, repeated charge/discharge of such a lithium secondary battery results in dissolution of the cathode active material as metal components at the cathode side and precipitation of such metal components at the anode side, which consequently causes the problem of electrolyte decomposition on the surface of anode. The dissolution and precipitation of the metal components and the electrolyte decomposition become severe during high-temperature storage of the battery, thereby resulting in decreases in residual capacity and recovery capacity of the battery.

In order to solve the problems associated with decreased residual capacity and recovery capacity of the battery, a variety of techniques have been introduced for preventing the dissolution of the metal components of the cathode active material in the lithium secondary battery. For example, there has been proposed a technique of decreasing the dissolution of metal elements over time into the electrolyte by reducing a specific surface area of the active material (Y. Xia, et al. J. of Power Source 24, 24-28 (1998)). However, this method involves preparation of active material particles into a large size, which in turn requires long-term heat treatment, and also disadvantageously suffers from deterioration of high-rate discharge characteristics and low-temperature characteristics of the electrode due to a decreased reaction area and an increased diffusion distance of lithium ions.

In addition to such a technique, a surface treatment method is widely used. For example, in order to improve high-temperature storage characteristics, a surface treatment technique using heterogeneous elements ($Li_2CO_3$, $Na_2CO_3$, $K_2CO_3$ and the like). However, such a surface treatment method also suffers from shortcomings in that severely decreases battery capacity and adds multiple manufacturing processes.

Therefore, there is a strong need in the art for the development of a technique capable of fundamentally solving the above-mentioned problems.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that incorporation of an organic ammonium compound capable of providing ammonium ions into a cathode and/or a separator of a lithium secondary battery results in improvements in residual capacity and recovery capacity after high-temperature storage of the battery as well as improvements in power retention of the battery at low and high temperatures. The present invention has been completed based on these findings.

DETAILED DESCRIPTION OF PREFERRED EMBODIMENTS

Hereinafter, the present invention will be described in more detail.

In accordance with an aspect of the present invention, the above and other objects can be accomplished by the provision of a secondary battery comprising a lithium transition metal oxide as a cathode active material wherein an organic ammonium compound is added to a cathode and/or is coated on a separator.

The organic ammonium compound can liberate ammonium ions which are capable of removing metal ions present in the electrolyte, such as manganese (Mn) ions, and forms a stable surface coating on the anode to thereby inhibit precipitation of metal ions. Therefore, it is possible to suppress additional electrolyte decomposition reaction resulting from precipitation of metal ions. In such a manner, addition of the organic ammonium compound to the cathode or coating of the organic ammonium compound on the separator can reduce degradation of high-temperature cycle characteristics of the lithium secondary battery and decreases in residual capacity and recovery capacity resulting from high-temperature storage of the battery, in conjunction with improvements of power retention at low and high temperatures.

Preferred examples of the organic ammonium compound added to the electrolyte may include organic ammonium compounds containing a carboxyl group, represented by Formula (I):

$$R_1\text{—}CO_2^-(NH_4)^+ \qquad (I)$$

wherein $R_1$ is optionally substituted alkyl or optionally substituted aryl.

If necessary, these compounds may be used alone or in any combination thereof.

As used herein, the term "optionally substituted" is intended to encompass the case in which the corresponding substituent(s) is/are substituted by one or more groups individually and independently selected from alkyl, cycloalkyl, alkenyl, cycloalkenyl, aryl, heteroaryl, heteroalicyclic, hydroxy, alkoxy, aryloxy, mercapto, alkylthio, arylthio, oxo, cyano, halogen, carbonyl, thiocarbonyl, O-carbamyl, N-carbamyl, acetyl, O-thiocarbamyl, N-thiocarbamyl, C-amido, N-amido, perhaloalkyl, sulfinyl, S-sulfonamido, N-sulfonamido, trihalomethanesulfonamido, optionally substituted sulfonyl, C-carboxy, O-carboxy, isocyanato, thiocyanato, isothiocyanato, nitro, silyl, trihalomethanesulfonyl, pyrrolidinyl, piperidinyl, piperazinyl, pyridinyl, morpholinyl, furyl, thiazolidine, isoxazole, azetidinyl, dioxolane, pyrazinyl, thienyl, aziridine, oxazolidine, imidazole, alkanoic acid, alkanoate, amino including mono- and di-substituted amino and protected derivatives thereof. Where appropriate, these substituents may also be optionally substituted.

As used herein, the term "alkyl" refers to an aliphatic hydrocarbon group. An alkyl moiety may be a "saturated alkyl" group, thus representing that no alkene or alkyne portion is contained. Alternatively, the alkyl moiety may be an "unsaturated allkyl" group, thus being capable of containing at least one alkene or alkyne portion. The term "alkene" moiety refers to a group in which at least two carbon atoms form at least one carbon-carbon double bond. The term "alkyne" moiety refers to a group in which at least two carbon atoms form at least one carbon-carbon triple bond. The alkyl moiety, regardless of whether it is saturated or unsaturated, may be branched, linear or cyclic.

Alkyl may contain 1 to 20 carbon atoms. Allkyl may also have a medium chain length containing 1 to 10 carbon atoms. In addition, alkyl may be lower alkyl containing 1 to 6 carbon atoms. For example, $C_1$-$C_4$ alkyl may be selected from hydrocarbyl groups containing 1 to 4 carbon atoms in the alkyl chain, i.e., the group consisting of methyl, ethyl, propyl, iso-propyl, n-butyl, iso-butyl, sec-butyl and t-butyl.

Typical alkyl denotes a hydrocarbon group which may be substituted by one or more groups individually and independently selected from methyl, ethyl, propyl, iso-propyl, n-butyl, iso-butyl, t-butyl, pentyl, hexyl, ethenyl, propenyl, butenyl, cyclopropyl, cyclobutyl, cyclopentyl and cyclohexyl.

As used herein, the term "aryl" refers to an aromatic group which has at least one ring having a conjugated pi ($\pi$) electron system and includes carbocyclic aryl (for example, phenyl) and heterocyclic aryl (for example, pyridine) groups. This term includes monocyclic or fused-ring polycyclic (i.e., rings which share adjacent pairs of carbon atoms) groups.

As used herein, the term "heteroaryl" refers to aryl including at least one heterocyclic ring.

As used herein, the term "heterocycle" refers to a carbocyclic group in which ring carbon atoms are substituted with oxygen, nitrogen or sulfur atoms. Examples of heterocycle includes, but are not limited to, furan, thiophene, pyrrole, pyrroline, pyrrolidine, oxazole, thiazole, imidazole, imidazoline, imidazolidine, pyrazole, pyrazoline, pyrazolidine, isothiazole, triazole, thiadiazole, pyran, pyridine, piperidine, morpholine, thiomorpholine, pyridazine, pyrimidine, pyrazine, piperazine and triazine.

As the term used throughout the specification of the present invention, the substituent "R" refers to, when it is described without specific designation of a suffix number, a substituent selected from the group consisting of alkyl, cycloalkyl, aryl, heteroaryl (bound via ring carbon atoms) and heteroalicyclic (bound via ring carbon atoms).

An "O-carboxy" group refers to a —RC(=O)O— group, with R as defined herein.

A "C-carboxy" group refers to a —C(=O)OR group, with R as defined herein.

An "acetyl" group refers to a —C(=O)CH$_3$ group.

A "trihalomethane sulfonyl" group refers to a Y$_3$CS(=O)$_2$— group, wherein Y is halogen.

A "cyano" group refers to a —CN group.

An "isocyanato" group refers to a —NCO group.

A "thiocyanato" group refers to a —CNS group.

An "isothiocyanato" group refers to a —NCS group.

A "sulfinyl" group refers to a —S(=O)—R group, with R as defined herein.

An "S-sulfonamido" group refers to a —S(=O)$_2$NR group, with R as defined herein.

An "N-sulfonamido" group refers to a RS(=O)$_2$NH— group, with R as defined herein.

A "trihalomethanesulfonamido" group refers to a Y$_3$CS(=O)$_2$NR— group, with Y and R as defined herein.

An "O-carbamyl" group refers to a —OC(=O)—NR group, with R as defined herein.

An "N-carbamyl" group refers to a ROC(=O)NH— group, with R as defined herein.

An "O-thiocarbamyl" group refers to a —OC(=S)—NR group, with R as defined herein.

An "N-thiocarbamyl" group refers to a ROC(=S)NH— group, with R as defined herein.

A "C-amido" group refers to a —C(=O)—NR$_2$ group, with R$_2$ as defined herein.

An "N-amido" group refers to a RC(=O)NH— group, with R as defined herein.

The term "perhaloalkyl" refers to an alkyl group in which all of hydrogen atoms are replaced with halogen atoms.

Other terms as used herein may be interpreted as having meanings commonly understood in the art to which the present invention pertains.

Preferably, R$_1$ is alkyl or aryl containing 1 to 10 carbon atoms. Particularly preferred are ammonium benzoate and ammonium pyridine benzoate.

The organic ammonium compound, for example in conjunction with a cathode active material, a conductive material and a binder, may be prepared into a cathode slurry and then incorporated into the cathode. Or, the organic ammonium compound may be incorporated into the cathode by coating it on the cathode active material applied to a current collector.

Alternatively, the organic ammonium compound may also be coated on a surface of the separator, using a suitable solvent. A suitable binder may be further included so as to impart stable binding of the organic ammonium compound to the separator during such a coating process.

The content of the organic ammonium compound is preferably in a range of 0.01 to 10% by weight, based on the total weight of the cathode mix. If the content of the ammonium compound additive is too low, it is difficult to achieve desired addition effects. On the other hand, if the content of the additive is too high, this leads to undesirable increased internal resistance of the fabricated battery, thereby deteriorating performance of the battery. Particularly preferred content of the additive is in the range of 0.01 to 1% by weight.

When it is desired to coat the organic ammonium compound on the separator, a coating amount of the organic ammonium compound is preferably in a range of 0.01 to 10% by weight, based on the total weight of the separator. If the coating amount of the ammonium compound additive is too low, it is difficult to achieve desired addition effects. On the other hand, if the coating amount of the additive is too high, this undesirably leads to increased internal resistance of the fabricated battery, thereby deteriorating performance of the battery. The particularly preferred coating amount of the additive is in the range of 0.01 to 1% by weight.

Examples of the lithium transition metal oxides that can be used as the cathode active material may include, but are not limited to, layered compounds such as lithium cobalt oxide (LiCoO$_2$) and lithium nickel oxide (LiNiO$_2$), or compounds substituted with one or more transition metals; lithium manganese oxides such as compounds of Formula Li$_{1+x}$Mn$_{2-x}$O$_4$ ($0 \leq x \leq 0.33$), LiMnO$_3$, LiMn$_2$O$_3$ and LiMnO$_2$; lithium copper oxide (Li$_2$CuO$_2$); vanadium oxides such as LiV$_3$O$_8$, V$_2$O$_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; $Fe_2(MoO_4)_3$, $LiFe_3O_4$, etc.

The cathode is, for example, fabricated by applying a mixture of the above cathode active material, a conductive material and a binder to the cathode current collector, followed by drying and pressing. If desired, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fibers and carbon fibers.

In accordance with another aspect of the present invention, there is provided a lithium secondary battery comprising the above-mentioned cathode. A method for fabricating the lithium secondary battery having a constitution composed of a cathode, an anode, a separator and a lithium salt-containing non-aqueous electrolyte is known in the art.

The anode is fabricated by applying an anode material to an anode current collector, followed by drying and pressing. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 \leq x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

As the non-aqueous electrolyte, a non-aqueous electrolytic solution, a solid electrolyte or an inorganic solid electrolyte may be utilized.

As the non-aqueous electrolytic solution that can be used in the present invention, for example, mention may be made of aprotic organic solvents such as N-methyl-2-pyrrolidone, cyclic and/or linear carbonate compounds including for example, propylene carbonate (PC), ethylene carbonate (EC), butylene carbonate (BC), dimethyl carbonate (DMC) and diethyl carbonate (DEC), gamma-butyro lactone (GBL), 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, ethyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate (MP) and ethyl propionate (EP). Among these solvent compounds, particularly preferred are ethylene carbonate (EC), propylene carbonate (PC), butylene carbonate (BC), vinylene carbonate (VC), diethyl carbonate (DEC), dimethyl carbonate (DMC), ethylmethyl carbonate (EMC), gamma-butyro lactone (GBL), sulfolane, methyl acetate (MA), ethyl acetate (EA), methyl propionate (MP) and ethyl propionate (EP).

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(CF_3SO_2)_2$, $LiN(C_2F_5SO_2)_2$, $LiN(CF_3SO_2)_2$, chloroborane lithium, lower aliphatic carboxylic acid lithium, lithium tetraphenyl borate and imide. Among these materials, particularly preferred are $LiClO_4$, $LiCF_3SO_3$, $LiC_4F_9SO_3$, $LiPF_6$, $LiBF_4$, $LiAsF_6$, $LiN(C_2F_5SO_2)_2$ and $LiN(CF_3SO_2)_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride.

EXAMPLES

Now, the present invention will be described in more detail with reference to the following examples. These examples are provided only for illustrating the present invention and should not be construed as limiting the scope and spirit of the present invention.

Example 1

1-1. Fabrication of Cathode

94% by weight of $LiMn_2O_4$ as a cathode active material, 2.5% by weight of Super-P as a conductive material, 1.5% by weight of PVdF as a binder, and 2% by weight of ammonium benzoate were added to NMP (N-methyl-2-pyrrolidone) as a solvent to thereby prepare a cathode mixture slurry. Thereafter, the resulting cathode slurry was coated on aluminum foil, followed by drying and pressing to thereby fabricate a cathode.

1-2. Fabrication of Anode

95% by weight of artificial graphite as an anode active material, 2% by weight of Super-P as a conductive material and 3% by weight of PVdF as a binder were added to NMP to thereby prepare an anode mixture slurry. Thereafter, the resulting anode slurry was coated on copper foil, followed by drying and pressing to thereby fabricate an anode.

1-3. Assembly of Battery

The cathode of Section 1-1 and the anode of Section 1-2 were sequentially stacked with disposition of a Celgard™ separator therebetween. Then, the resulting electrode assembly was mounted into a battery case to which 1M $LiPF_6$ EC/EMC electrolyte was then injected to fabricate a lithium secondary battery.

Example 2

A secondary battery was fabricated in the same manner as in Example 1, except that 4% by weight of ammonium benzoate was added.

Example 3

A secondary battery was fabricated in the same manner as in Example 1, except that 2% by weight of ammonium pyridine benzoate was added instead of ammonium benzoate.

Example 4

A secondary battery was fabricated in the same manner as in Example 1, except that 4% by weight of ammonium pyridine benzoate was added instead of ammonium benzoate.

Example 5

1-1. Fabrication of Cathode

94% by weight of $LiMn_2O_4$ as a cathode active material, 3.5% by weight of Super-P as a conductive material, and 2.5% by weight of PVdF as a binder were added to NMP (N-methyl-2-pyrrolidone) as a solvent to thereby prepare a cathode mixture slurry. Thereafter, the resulting cathode slurry was coated on aluminum foil, followed by drying and pressing to thereby fabricate a cathode.

1-2. Fabrication of Anode

95% by weight of artificial graphite as an anode active material, 2% by weight of Super-P as a conductive material and 3% by weight of PVdF as a binder were added to NMP to thereby prepare an anode mixture slurry. Thereafter, the resulting anode slurry was coated on copper foil, followed by drying and pressing to thereby fabricate an anode.

1-3. Assembly of Battery

2% by weight of ammonium benzoate was coated on a surface of a Celgard™ separator. The cathode of Section 1-1 and the anode of Section 1-2 were sequentially stacked with disposition of the thus-coated separator therebetween. Then, the resulting electrode assembly was mounted into a battery case to which 1M $LiPF_6$ EC/EMC electrolyte was then injected to fabricate a lithium secondary battery.

Example 6

A secondary battery was fabricated in the same manner as in Example 5, except that 3% by weight of ammonium pyridine benzoate was coated on a surface of a Celgard™ separator.

Comparative Example 1

A secondary battery was fabricated in the same manner as in Example 1, except that ammonium benzoate was not added.

Experimental Example 1

Batteries fabricated in Examples 1 to 6 and Comparative Example 1 were stored at a temperature of 65° C. for 7 days and were respectively measured for residual capacity and recovery capacity thereof. The results thus obtained are given in Table 1 below.

TABLE 1

| Batteries | Initial capacity (mAh) | Residual capacity (mAh) | Recovery capacity (mAh) | Residual eff. (%) | Recovery eff. (%) |
|---|---|---|---|---|---|
| Ex. 1 | 5.71 | 3.99 | 4.45 | 69.88 | 77.93 |
| Ex. 2 | 5.00 | 4.12 | 4.44 | 82.40 | 88.80 |
| Ex. 3 | 5.76 | 4.06 | 4.51 | 70.49 | 78.30 |
| Ex. 4 | 5.75 | 4.11 | 4.52 | 71.48 | 78.61 |
| Ex. 5 | 5.81 | 4.14 | 4.55 | 71.26 | 78.31 |
| Ex. 6 | 5.51 | 3.85 | 4.32 | 68.06 | 77.31 |
| Comp. Ex. 1 | 5.61 | 3.45 | 3.92 | 61.50 | 69.88 |

As can be seen from Table 1, it was confirmed that the batteries of Examples 1 to 6 exhibit approximately 10% improvements in the residual capacity and recovery capacity of battery, as compared to the battery of Comparative Example 1. Moreover, according to the results of additional experiments, it was also ascertained that the difference between the batteries of Examples 1 to 6 and the battery of Comparative Example 1 increases with the storage period thereof in view of the residual capacity and recovery capacity of battery.

INDUSTRIAL APPLICABILITY

As apparent from the above description, a secondary battery in accordance with the present invention exhibits improvements in residual capacity and recovery capacity even after high-temperature storage of the battery, as well as improvements in power retention of the battery at low and high temperatures.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising a lithium transition metal oxide as a cathode active material, wherein an organic ammonium compound is added to a cathode and/or is coated on a separator, and the organic ammonium compound is at least one compound of Formula (I):

$$R_1\text{—}CO_2^-(NH_4)^+, \quad (I)$$

wherein $R_1$ is (i) an alkyl group (ii) an aryl group or (iii) a heterocycle-substituted aryl.

2. The battery according to claim 1, wherein the organic ammonium compound is ammonium benzoate and/or ammonium pyridine benzoate.

3. The battery according to claim 1, wherein the organic ammonium compound is added to the cathode in conjunction with a cathode active material during the preparation of a cathode slurry, or is added in the form of coating to the cathode active material applied to a current collector.

4. The battery according to claim 1, wherein 0.01 to 10% by weight of the organic ammonium compound is added based on the total weight of the cathode mix.

5. The battery according to claim 1, wherein 0.01 to 10% by weight of the organic ammonium compound is coated on a surface of the separator, based on the total weight of the separator.

6. The battery according to claim 1, wherein the cathode active material is a lithium transition metal oxide and the anode active material is composed of a carbon material.

* * * * *